(12) United States Patent
Ohe et al.

(10) Patent No.: US 6,295,110 B1
(45) Date of Patent: Sep. 25, 2001

(54) LIQUID CRYSTAL DISPLAY DEVICE HAVING ORIENTATION FILM ORIENTED BY LIGHT

(75) Inventors: Masahito Ohe; Shigeru Matsuyama; Kenkichi Suzuki; Masaaki Matsuda, all of Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/185,647

(22) Filed: Nov. 4, 1998

(30) Foreign Application Priority Data

Nov. 5, 1997 (JP) .................................................. 9-302821

(51) Int. Cl.$^7$ ................................................. G02F 1/1333
(52) U.S. Cl. ............................................................. 349/124
(58) Field of Search ................................................ 349/124

(56) References Cited

U.S. PATENT DOCUMENTS

| | | | |
|---|---|---|---|
| 5,587,822 | * 12/1996 | Lee | 349/124 |
| 5,604,615 | * 2/1997 | Iwagoe et al. | 349/124 |
| 5,710,608 | * 1/1998 | Nakabayashi et al. | 349/123 |
| 5,817,743 | * 10/1998 | Gibbons et al. | 349/44 |

* cited by examiner

Primary Examiner—James A. Dudek
(74) Attorney, Agent, or Firm—Antonelli, Terry, Stout & Terry, LLP

(57) ABSTRACT

A polarized light irradiation method for achieving both wide view-field angles and display uniformity with less display irregularity as well as an apparatus for use in attaining this polarized light irradiation method. After reshaping output light from a light source 100 into a beam pattern BP, a polarized light separation plate 108 is used to separate therefrom only P-polarized wave components while simultaneously causing the polarizing axis of the separated P-polarized wave components to be identical to the short side direction of the rectangular beam pattern BP thereby letting it pass through an organic high-molecular or polymeric film acting as an optical radiation surface 110 for addition of a liquid crystal orientation controllability thereto.

19 Claims, 11 Drawing Sheets

Flow of Signal

LIQUID CRYSTAL DISPLAY DEVICE HAVING ORIENTATION FILM ORIENTED BY LIGHT

BACKGROUND OF THE INVENTION

The present invention relates generally to liquid crystal display devices with direction-constant optical anisotropy, provided by irradiation of polarized light onto the surface of an organic high-molecular or polymeric film or the like, and to polarized light irradiation methods for irradiating polarized light for provision of such optical anisotropy, as well as apparatus used therefor. More particularly, the invention relates to a polarized light irradiation method and apparatus for providing added liquid crystal orientation controllability by irradiation of polarized light onto an orientation film constituting more than one liquid crystal display element.

Liquid crystal display devices have been widely used as devices for displaying a variety of images, including still images and motion pictures.

The liquid crystal display devices of this type are basically configured from a pair of substrates with a liquid crystal layer disposed between them to thereby constitute what is called a "liquid crystal panel" structure, wherein at least one of the substrates is made of an optically transparent material, such as glass or the like. The liquid crystal display devices may be categorized into two forms, one of which is arranged to turn-on and turn-off of a specified pixel by selectively applying a voltage to a variety of types of electrodes for pixel formation as formed on the substrate of the liquid crystal panel, and the other of which is to effect the turn-on/off of a certain pixel by forming the various types of electrodes and an active element for pixel selection and then selecting this active element.

Especially, the liquid crystal display devices of the latter type are called "active matrix" type devices, and are the major industry-leading devices of the currently available liquid crystal display devices, due to the high contrast and high-speed visualizability and other advantages they offer. Most prior known active-matrix type liquid crystal display devices employ the so-called "longitudinal electric field" scheme in which an electric field is applied between electrodes formed on one substrate and those formed on the other substrate, which electric field is used for changing the orientation direction of the liquid crystal layer disposed between the substrates.

In recent years, however, a liquid crystal display device of the type employing a so-called "lateral electric field" scheme (also known as the IPS system) has been developed, in which the direction of an electric field being applied to the liquid crystal layer is substantially parallel to the substrate surface. There is a known liquid crystal display device of the lateral electric field type which is arranged to make use of a comb-shaped electrode configuration for one of the two substrates, thereby obtaining a drastically widened viewing angle (Japanese Patent Disclosure No. 63-21907, and U.S. Pat. No. 4,345,249).

On the other hand, as one representative example of methods for forcing the liquid crystal molecules constituting a liquid crystal layer to face or point toward a specified direction, a technique has been reduced to practice for forming on a substrate an organic orientation film made of an organic high polymer film, such as, for example, a polyimide-based film or equivalents thereto, which film is then subjected to rubbing treatment, thereby attributing liquid crystal orientation control functions thereto.

A method (optical orientation) is also known for achieving such liquid crystal orientation controllability by irradiation of light upon the orientation film of a polyimide-based organic high-molecular film or the like as formed on a substrate (see U.S. Pat. No. 4,974,941; Published Japanese Patent Application or "PJPA" No. 5-34699; PJPA No. 6-281937; PJPA No. 7-247319).

However, these prior art optical orientation techniques have not been applied to the lateral electric field type system, and no consideration has been given to the achievability of specific effects and advantages obtainable from application of such optical orientation techniques to the lateral electric field type system, which is different in design concept from the longitudinal electric field type system, in that the various types of electrodes for pixel formation are formed on only one substrate in the lateral electric field type system.

Prior art orientation methods using rubbing techniques for orienting liquid crystal molecules of the liquid crystal panel in a specified direction involve processing methods in which cloth is brought into direct contact with the orientation films, which can possibly produce the risk of unwanted generation of static electricity and cause contamination of such orientation films during such rubbing processing.

Generation of static electricity on the orientation film can result in destruction of the switching elements, such as TFTs and the like, and also can lead to a change in switching characteristic. Contamination of the orientation film would result in a local irregularity of the frequency dependency of a threshold voltage and a decrease in voltage hold rate, or alternatively, a change in pre-tilt angle and a change in liquid crystal orientation.

Further, as the substrate size increases, it becomes more difficult to adequately control the force applied during rubbing over the entire substrate area, which in turn leads to the risk that scars or other surface irregularities can occur due to rubbing on a large-size substrate.

Another problem faced by the prior art is that fine cutting particles or chips can be produced from a film being rubbed with cloth, which might serve as a significant dust source inside a cleanroom during the manufacture of liquid crystal display devices, thereby greatly reducing the production yield at the other manufacturing process steps.

A further problem lies in the fact that, since the substrate inherently has a somewhat irregular surface configuration due to the presence of electrodes and active elements (switching elements such as TFTs and the like) formed thereon, such surface configuration results in the presence of several incompletely rubbed portions on the resulting substrate surface after rubbing treatment has been performed, which portions undesirably result in a lack of light—known as optical dislocation—in a back display, which leads to a decrease in contrast.

The aforementioned problems become more severe as the substrate increases in size.

On the other hand, unlike the above-mentioned orientation processing methods using such contact schemes, an optical orientation technique is known which is capable of providing the intended liquid crystal orientation controllability without effecting control with the surface of an organic high-molecular film being used. This method involves the irradiation of polarized light having a certain polarizing axis onto an organic high polymer film thereby adding thereto the orientation control functionality in a way corresponding to the axis of polarized light thereof.

However, this approach is still faced with a potential problem as to how the light is radiated onto a practically implemented substrate of liquid crystal display elements in order to attain the same required high efficiency as that of the rubbing method or the like, while at the same time retaining the ability to uniformly irradiate rays of light thereon. Especially, as presently available liquid crystal display devices increase in size and dimension, the region in which the liquid crystal needs to be oriented tends to increase more and more. The technical trend in currently available liquid crystal display devices is to achieve an effective area which is ten (10) inches in diagonal measure or wider; and, in near future, a size exceeding 10 inches will become the major technological approach. Unfortunately, the efficiency presently achieved remains considerably less than that of the rubbing treatment because of the fact that the region is too wide to irradiate polarized light for optical orientation. In regard to a polarized light irradiation apparatus, no such apparatus exists which is capable of simultaneous exposure of a large-size substrate measuring 10 inches or greater. Currently, the size limit of optical irradiation is 7 to 8 inches in diagonal dimension. Accordingly, it remains impossible to apply the optical orientation technique with an efficiency equivalent to that of the rubbing treatment to those substrates which are 10 inches or greater in size; although, such technique is expected to be the major approach in the future in the manufacture of liquid crystal display devices.

SUMMARY OF THE INVENTION

It is therefore an object of the present invention to provide a liquid crystal display device of large size, diagonally measuring 10 inches or greater, which is capable of avoiding the problems encountered with the prior art and is also capable of achieving both wide visual field angles and a display uniformity with less display irregularities. Another object of the invention is to provide a polarized light irradiation method for efficiently performing optical orientation in large area regions, as well as a polarized light irradiation apparatus for use in adding liquid crystal orientation controllability to an orientation film of liquid crystal display elements by use of the polarized light irradiation method.

Means for attaining the foregoing objects will be explained as follows.

Figure 1:
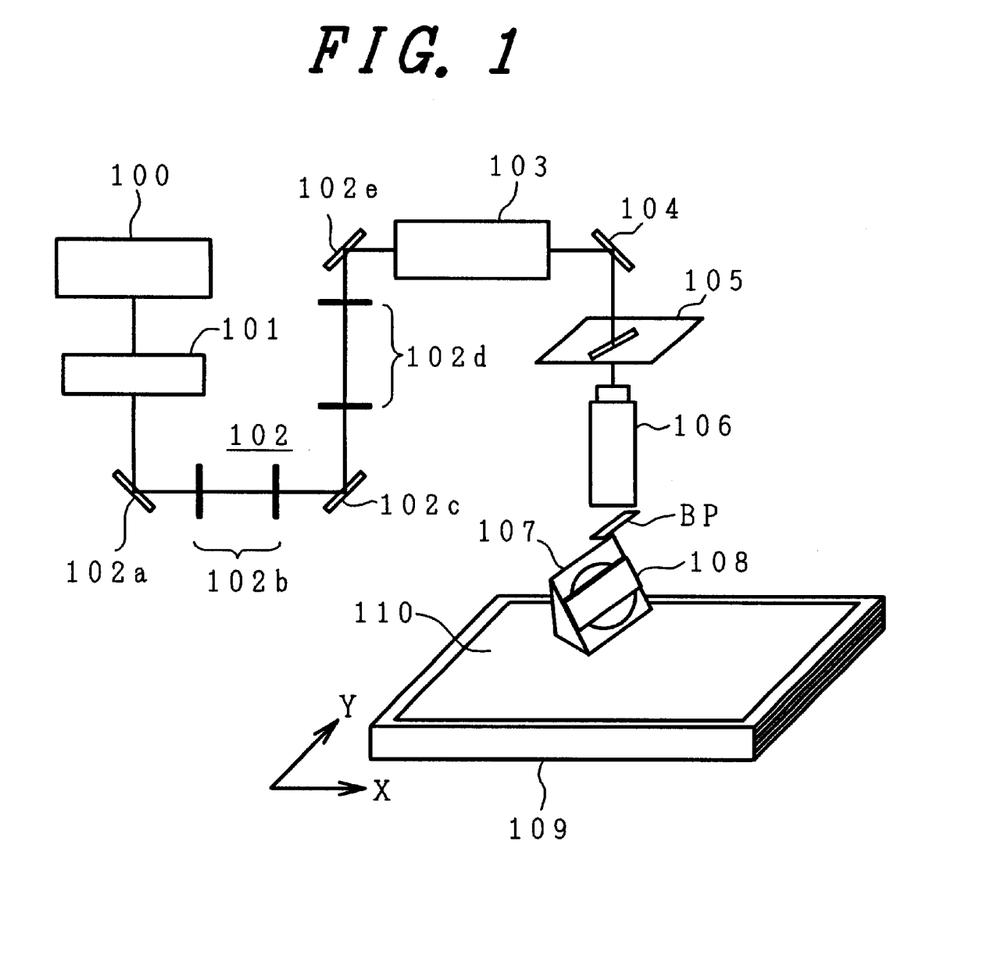
FIG. 1 is a conceptual diagram for explanation of a polarized light irradiation method, showing an optical system for use in realizing the method.

FIG. 1 is a conceptual diagram showing a pictorial representation for explanation of a polarized light irradiation method in accordance with the present invention, along with an optical system for use in practical implementation of this methodology. In addition, FIGS. 2A and 2B are illustrations for explaining the polarized light separator shown in FIG. 1, wherein FIG. 2A is a perspective view and FIG. 2B is a side view of the separator.

Figure 2A:
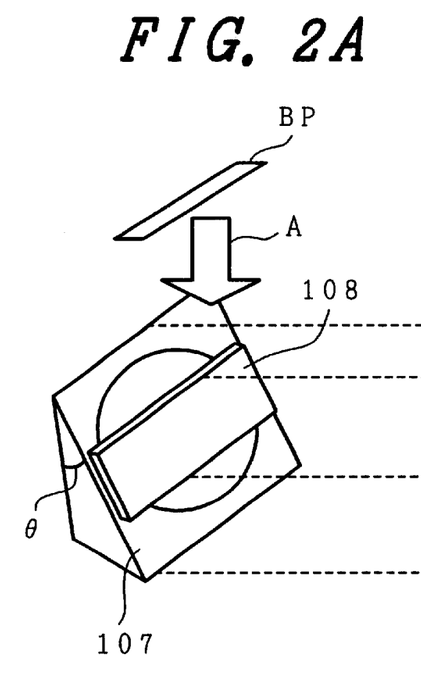
FIGS. 2A and 2B are diagrams showing the polarized light separator of FIG. 1.
Figure 2B:
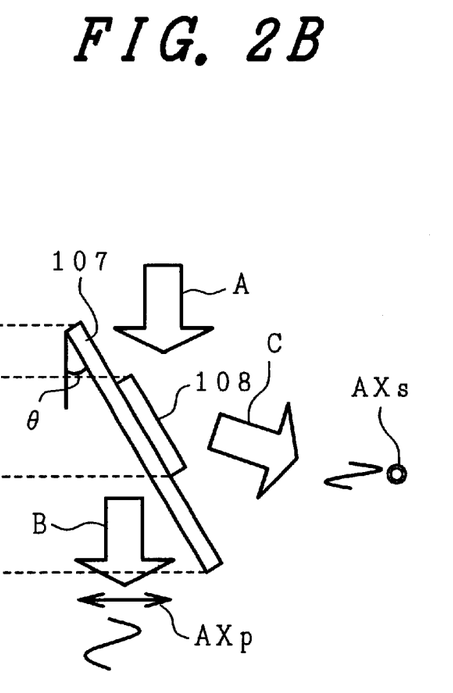

In FIGS. 1 and 2A–2B, the reference numeral 111001, designates a light source, preferably a laser; numeral 101 denotes an attenuator; 102 is a relay optical system (102a is a first mirror, 102c is a second mirror, 102e is a third mirror, 102b is a first lens system, 102d is a second lens system); 103 indicates a homogenizer; 104 indicates a fourth mirror; 105 indicates a slit; 106 indicates an image-formation/focusing lens system; 107 denotes a holder; 108 denotes a polarized light separator; 109 denotes a scanning stage; and 110 denotes an optical exposure/irradiation plane.

Light output from the light source 100 is guided through the attenuator 101, relay optical system 102, homogenizer 103 and fourth mirror 104 in this order, so that it is equalized or rendered uniform in optical intensity; thereafter, the resulting light arrives at the slit 105.

The slit 105 is a rectangular opening, so that the light which passes through the slit is re-shaped in cross-section or profile into a corresponding rectangular beam pattern for introduction to the image-formation lens system 106, and the output light emitted from the image-formation lens system 106 is also converted to have a rectangular beam pattern, which is then incident upon the polarized light separator 108.

The polarized light separator 108 is comprised of a quartz plate and multiple films formed thereon, wherein its axis of optical polarization is formed on a surface which lies parallel to the optical polarizing axis AXP of P-waves of the incident light beam (i.e. the light of beam pattern BP leaving the image-formation lens system 106). The separator 108 is supported in such a manner as to be held by the holder 107 in a state in which it is tilted at the Brewster angle θ relative to the optical axis of the incident light beam. Note here that the shape of the quartz plate should not be limited only to that of a rectangle.

As shown in FIGS. 2A–2B, disposing the polarized light separator means 108 at the Brewster angle θ permits the S-wave component B (optical polarization axis $AX_s$) contained in the incident light beam "A" of the beam pattern BP to be selectively reflected off at the polarized light separator plate 108.

Accordingly, the resultant light beam that has passed through the polarized light separator 108 to reach the light irradiation plane 110 is only the P-wave component having the optical polarization axis $AX_p$.

The irradiation plane 110 is supported on a scanning stage 109 which is movable in two-dimensional space perpendicular to the optical axis of the irradiation light. By letting the scan stage 109 move in the direction of the arrows X, Y makes it possible to two-dimensionally irradiate the irradiation plane 110 in a region that is wider than the size of the light beam pattern BP.

It is noted that, in cases where a polarized light separator plate (this will also be explained using the reference numeral 108 hereinafter) with multiple films formed on the surface of a rectangular quartz plate is used as the polarized light separator 108, either one of the following arrangements is employable in principle: rendering the shorter side of the P-wavels optical polarization axis $AX_p$, identical to a plane lying parallel therewith (the short side is parallel to the light irradiation plane); or alternatively, letting the longer side thereof be identical thereto (the long side and the irradiation plane are parallel to each other). Preferably, the former arrangement of letting the short side be identical to the P-wave's polarization axis $AX_p$ may be employed, thereby making it possible to irradiate the large-area irradiation plane 110 with increased efficiency.

An explanation will now be given of an irradiation effect obtainable in the case the polarized light separator plate 108 is disposed at the Brewster angle such that the short side and long side thereof are rendered identical to the irradiation plane 110.

Figure 3A:
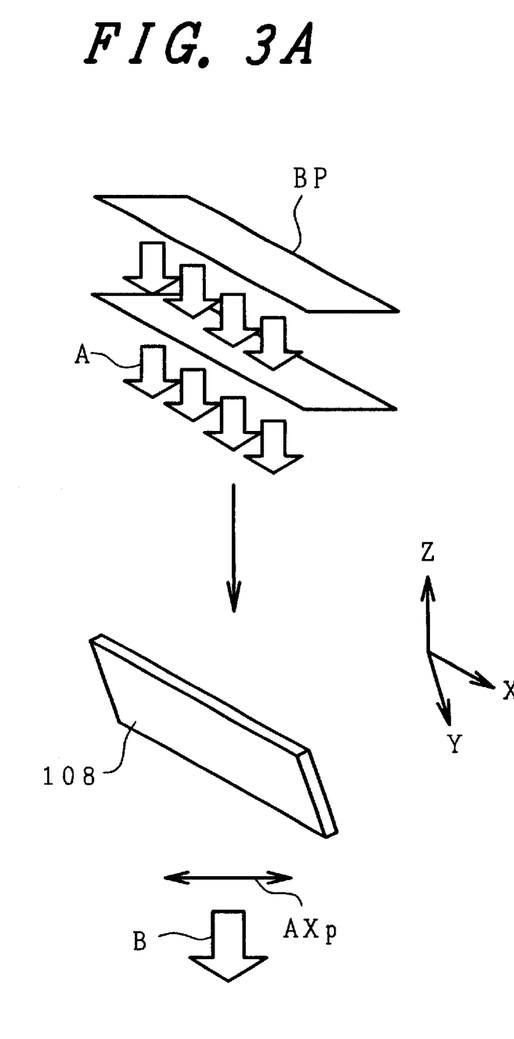
FIGS. 3A–3B are diagrams used for explanation of irradiation effects due to differences in layout between a light beam and a polarized light separator plate.
Figure 3B:
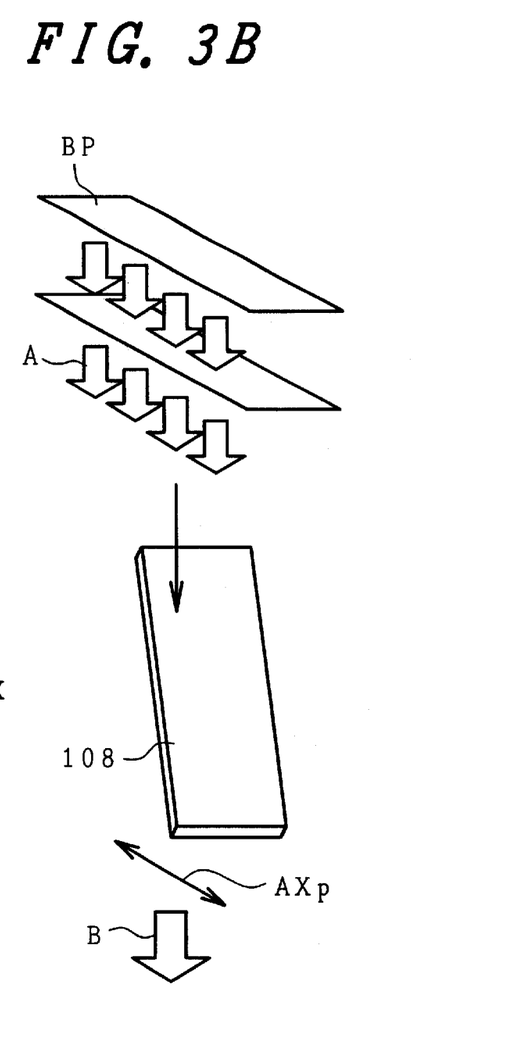

FIGS. 3A–3B are model-like diagrams each showing a pictorial representation for explanation of the irradiation effect due to differences in layout between a light beam and polarized light separator plate, wherein, supposing that the irradiation plane 110 is an orientation film of a substrate constituting a liquid crystal panel, FIG. 3A indicates a case where the long side of the rectangular polarized light separator plate 108 lies parallel to the substrate at the Brewster angle (oblong layout), while FIG. 3B shows a case where the short side of the rectangular polarized light separator plate 108 lies in parallel with the substrate at the Brewster angle (longitudinal layout).

In the oblong layout shown in FIG. 3A, since the polarized light separator plate 108 is disposed so that its long side lies parallel to the substrate, when performing a single scanning over the area of a large-area substrate, the long side of the polarized light separator plate is extended in the X-axis direction (long side direction) without extending the polarized light separator plate 108 in the Z-axis direction (optical axis direction of irradiation light), which in turn allows the long side to be extended from the polarized light separator plate 108 to lead directly to expansion of the irradiation region, while simultaneously enabling achievement of irradiation at uniform intensity because of the fact that the substrate's irradiation surface and the polarized light separator plate 108 will no longer be far from each other.

In contrast thereto, in the longitudinal layout shown in FIG. 3B, although a polarized light separator plate with its long sides lengthened should be required to carry out the intended irradiation over an increased area at a single scanning step, the polarized light separator plate 108 in this layout will be extended in a certain direction which lets it extend far from the substrate surface—that is, in the Z-axis direction. In this case, however, since the polarized light separator plate 108 is tilted by an angle corresponding to the Brewster angle, extension of the long side of the polarized light separator plate 108 would not result in attainment of the ability to irradiate a large area, while additionally dealing with difficulties in achieving a uniform intensity of the light being emitted.

In the oblong layout shown in FIG. 3A, that is, the layout which lets the P-wave polarized light's optical polarization axis be identical to the short side direction (Y-direction) of the polarized light separator plate 108, it is possible to efficiently achieve the intended light irradiation onto a large-area substrate in a shortened time period, by designing the dimension of the polarized light separator plate 108 so that it measures 10 cm or greater on its long side—preferably, 20 cm or longer.

Incidentally, in view of the fact that the S-wave polarized light component that is to be reflected at the polarized light separator plate does affect formation of an orientation film, it is required that light C of such S-wave polarized light component be prevented from hitting the substrate.

Figure 4:
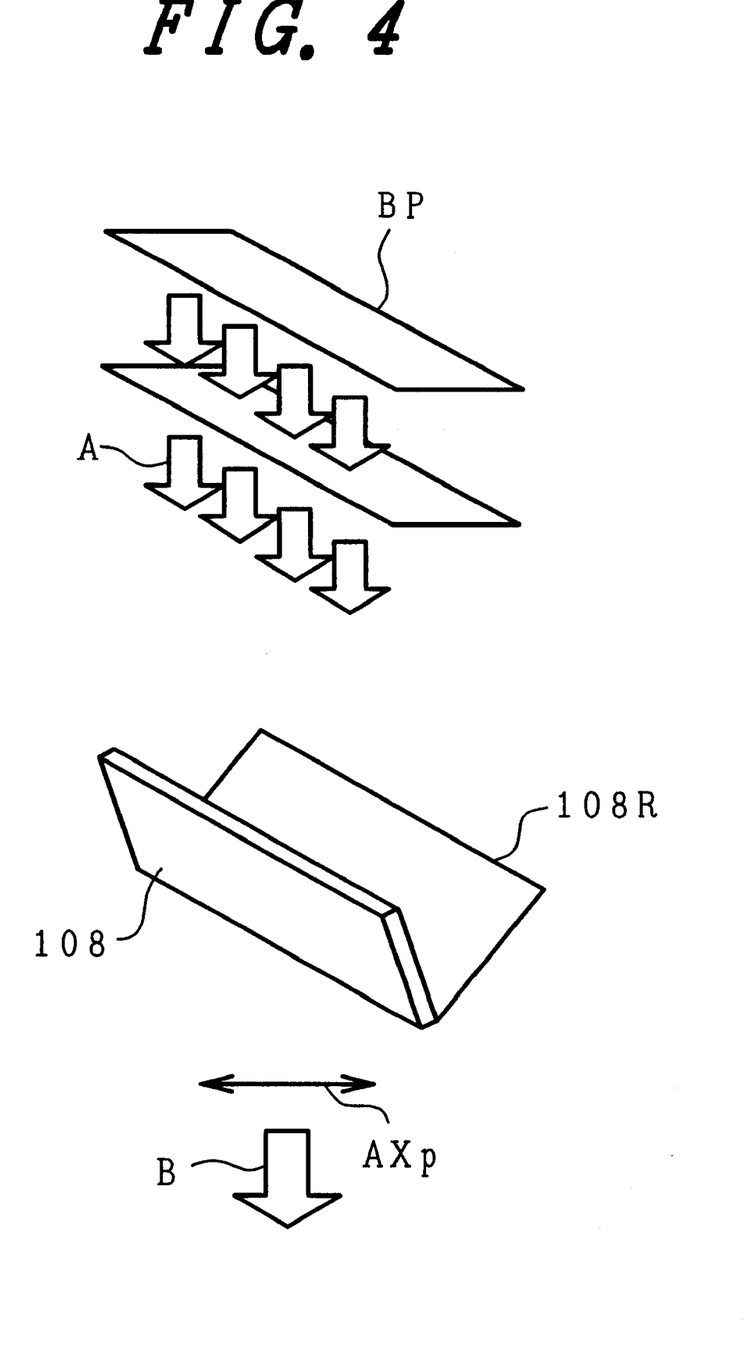
FIG. 4 is a diagram showing a pictorial representation for explanation of one exemplary configuration for use in preventing S-wave polarized light components from being reflected toward the substrate.

FIG. 4 is a diagram showing a pictorial representation for explanation of one exemplary configuration for use in preventing rays of the S-wave polarized light component from being reflected toward the substrate.

With the arrangement depicted herein, an optical absorptive member 108R of a light absorption material is positioned to absorb the light C of the S-wave polarized light component at the light output side of the polarized light separator plate 108. This optical absorptive member 108R may be arranged in a manner such that a plate-like member with the light absorption material coated thereon is attached along the substrate-side long side of the polarized light separator plate 108; alternatively, it may be configured so that the light absorption material is directly coated on the surface of the polarized light separator plate 108, by way of example.

Note that in order to achieve the most efficient irradiation processing (optical orientation processing) of a large-area substrate (orientation film), it is desirable that the whole of such orientation film be exposed at one time. However, the device structure suffers from difficulties, due to the limitations of the area of the output light provided from the light source and the limit as to the size of a beam pattern BP and the like, in uniformly irradiating polarized light onto the entire orientation film, while maintaining the degree of optical polarization as high as possible.

In order to solve this problem, it will be effective to arrange the scanning stage 109 which mounts thereon a substrate that is the irradiation plane 110, as a two-dimensionally movable element, such as, for example, an X-Y stage or an equivalent thereof, to thereby two-dimensionally scan the substrate for effecting irradiation processing of the substrate by using line-sequential scanning techniques.

In particular, combining this line-sequential scanning technique with the scheme for extension of the effective or "net" length of the polarized light separator plate 108 along the long side direction thereof makes it possible to irradiate the whole of a desired surface in a single scanning step. Use of such a scanning technique offers technical advantages including a decrease in the working time period and removal of on-the-screen seam lines otherwise occurring in a way corresponding to joint lines of light irradiation during scanning of neighboring ones, as compared to the case where the scanning is carried out through multiple, such as two or three, line-sequential process steps.

Additionally, in cases where the polarized light separator plate is of a length that makes it impossible to irradiate the overall substrate in a single scanning step, it becomes possible by combination of the configuration shown in FIG. 4 to produce the intended irradiation with respect to the whole of such a substrate in a single scanning step, as stated above.

Figure 5:
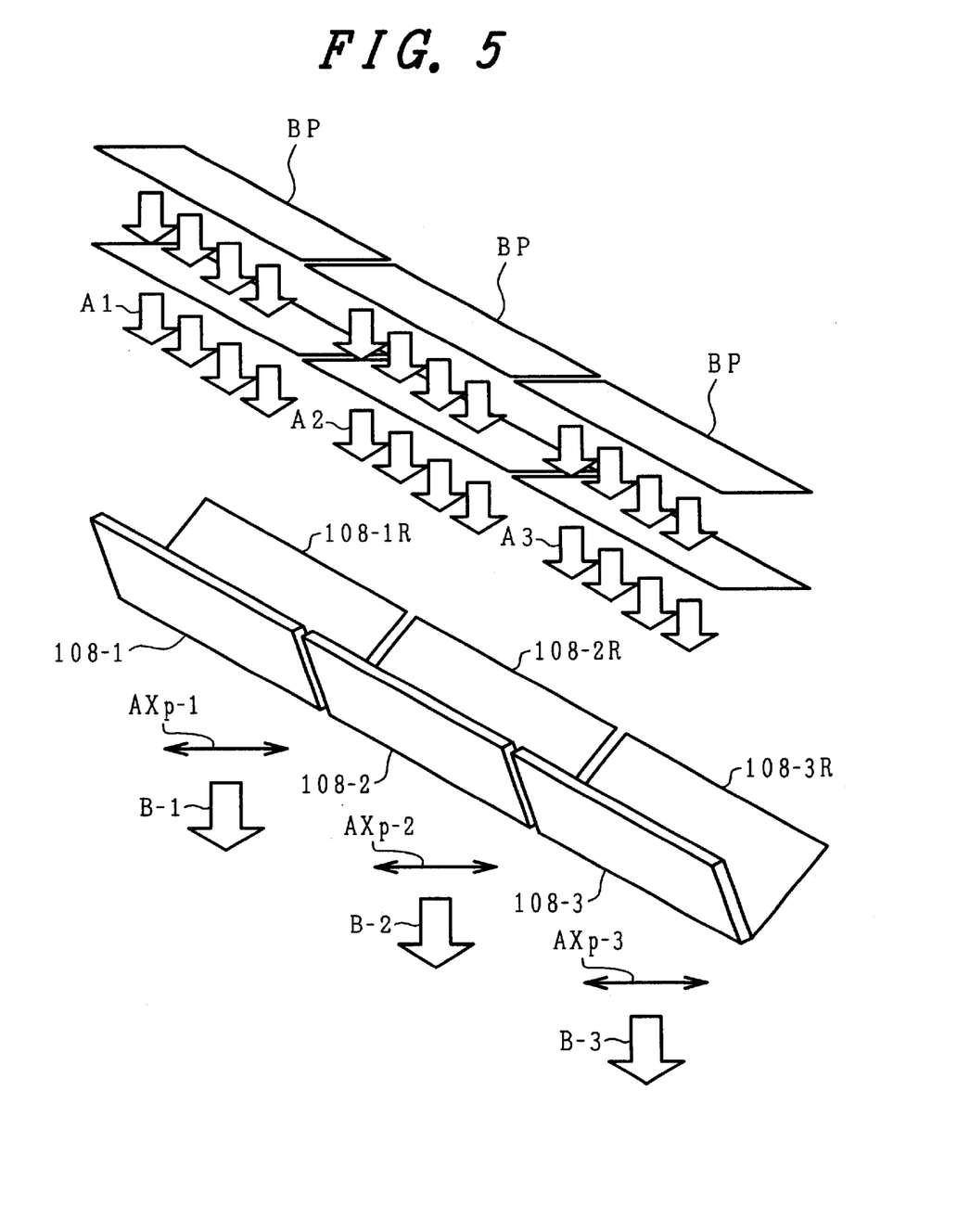
FIG. 5 is a diagram showing a pictorial representation for explanation of a polarized light irradiation method and the configuration of an apparatus for performing the method in accordance with the present invention.

FIG. 5 is a diagram showing a pictorial representation for explanation of a polarized light irradiation method in accordance with the present invention and an apparatus for use therewith, wherein the reference characters $BP_1$, $BP_2$, $BP_3$ are used to designate beam patterns; $A_1$, $A_2$, $A_3$ denote incident light beams; $108_{-1}$, $108_{-2}$, $108_{-3}$ indicate polarized light separator plates; $108_{-1}R$, $108_{-2}R$, $108_{-3}R$ denote optical absorptive members; $AX_{P-1}$, $AX_{P-2}$, $AX_{P-3}$ denote the optical polarization axes of P-wave components; $B_{-1}$, $B_{-2}$, $B_{-3}$ denote polarized light rays (irradiation light) of S-wave components as contained in the incident light beams "A". As illustrated herein, this embodiment is configured such that three independent sets of arrangements each shown in FIG. 4 are provided, while three polarized light separator plates $108_{-1}$, $108_{-2}$, $108_{-3}$ are disposed in an inline fashion along the long side direction thereof, thereby enabling the irradiation light rays $B_{-1}$, $B_{-2}$, $B_{-3}$ to cover the width direction of a substrate. Whereby, it becomes possible to perform irradiation of the whole substrate by execution of a single scanning process, as mentioned previously.

Also, in the case of adding (optical orientation) the orientation controllability to an orientation film formed on the substrate of a liquid crystal panel, the orientation film is softened by irradiation of polarized light while providing a heater for heating the substrate to heat the orientation film, which in turn facilitates the occurrence of a structural change or reaction in an organic high polymer film due to irradiation of such polarized light. Thus, irradiating the light while heating becomes an effective means for efficiently performing the intended optical orientation.

It is noted that, while in the above explanation an example was given which employs an excimer laser as the light source, the light source used therein should not exclusively be limited thereto, since any other types of light sources may also be used, including an argon laser, a gas laser, such as a carbon dioxide gas laser, a solid-state laser, a semiconductor laser, a pigment laser, and other possible laser light sources, as well as any possible combination of non-linear optical materials with these lasers for utilization of the harmonic components thereof. Furthermore, a high-pressure, middle-pressure or low-pressure mercury arc lamp or xenon lamp or the like may also be used rather than the aforesaid various types of lasers.

DETAILED DESCRIPTION OF THE PREFERRED EMBODIMENTS

Various embodiments of the present invention will be explained in detail with reference to the accompanying drawings.

EMBODIMENT 1

In the illustrative embodiment, a pair of transparent glass substrates are employed as the substrates constituting a liquid crystal panel, which substrates are surface-polished glass plates that are 0.7 mm in thickness, 230 mm×370 mm in size, and have a 203 mm×270 mm display region. Thin-film transistors (TFTS) are formed on one of these substrates with a silicon nitride film being formed thereon as a dielectric film. In addition, a dielectric film is formed to cover both the pixel electrodes and a common electrode, which are the electrodes used in driving the liquid crystal; and, an orientation film made of polyimide is formed thereon to thereby provide a TFT substrate. Note that chromium, which is a metal is used for the pixel electrodes and the common electrode.

Figure 6A:
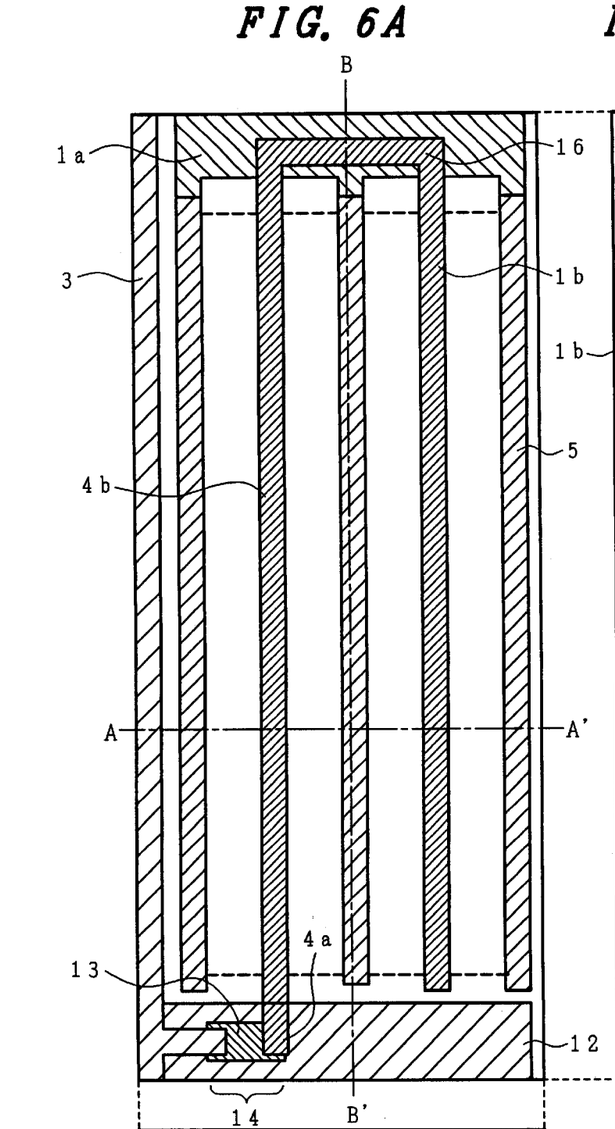
FIGS. 6A to 6C are diagrams for explanation of one unit pixel portion of a TFT substrate in which liquid crystal orientation controllability has been added by optical orientation to an orientation film in accordance with the present invention.
Figure 6B:
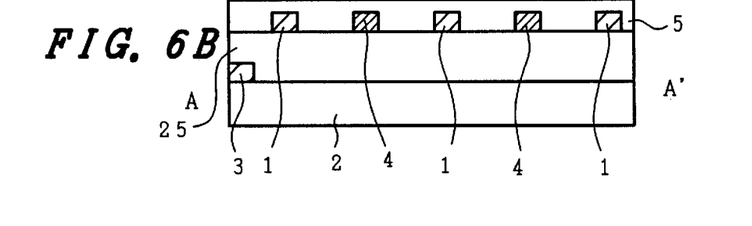
Figure 6C:
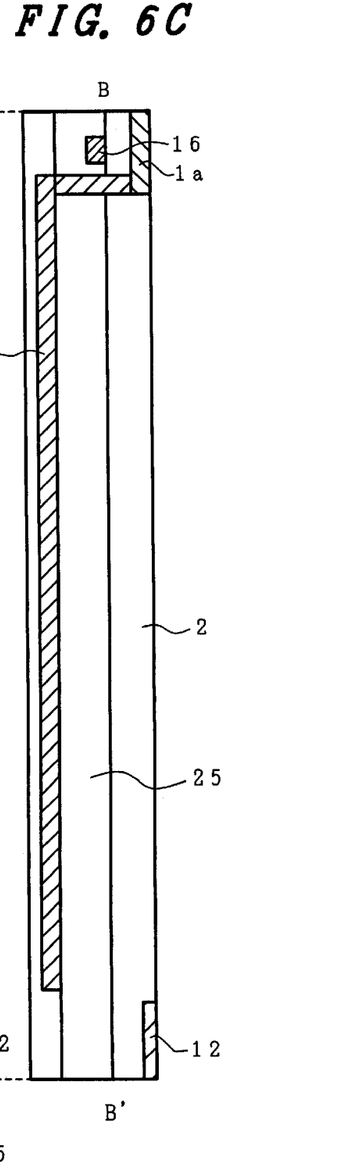

FIGS. 6A to 6C are diagrams of a unit pixel portion of the TFT substrate with liquid crystal orientation controllability being added to the orientation film by an optical orientation technique in accordance with the present invention, wherein FIG. 6A is a plan view as seen from a direction perpendicular to the substrate, FIG. 6B is a cross-sectional view of the structure of FIG. 6A taken along the line A–A', and FIG. 6C is a sectional view of the structure of FIG. 6A taken along line B–B'.

A thin-film transistor (TFT) 14 is made up of a pixel electrode (source electrode) 4, an image signal electrode (drain electrode) 3, a scanning electrode (gate electrode) 12, and an amorphous silicon layer (a-Si) 13. The scan electrode 12 and one part 1a of the common electrode are arranged by patterning the same metal layer; and, similarly, the image signal electrode 3 and part 4a of the common electrode are arranged by patterning the same metal layer. Further, after formation of a dielectric film 25, part 1b of the common electrode, which is the portion used in driving the liquid crystal, is connected via a through-hole to the part 1a of the common electrode, while the pixel electrode is also contacted via a through-hole at a transistor section thereby providing part 4b of the pixel electrode. This part 1b of the common electrode and the part 4b of the pixel electrode are formed using indium tin oxide (ITO).

A capacitive element 16 for formation of a storage capacitance is formed to have a structure in which a dielectric protective film (gate insulation film) 2 is laid or "sandwiched" between the pixel electrode 4 and the common electrode 1 in a region used in providing coupling between two common electrodes 1. As shown in the plan view of FIG. 6A, the pixel electrode 4 is disposed among three common electrodes 1. The pixel pitch is 100 μm in the lateral direction (that is, between the image signal lead electrodes) and 300 μm in the longitudinal direction (i.e. between the scan lead electrodes). The electrode width is designed so that the scan electrodes and signal electrodes, as well as common electrode lead sections (those portions extending parallel (the lateral direction in FIGS. 7A–7C as will be later described) with the scan lead electrodes), which are the lead electrodes spanning between a plurality of pixels, are relatively wider to thereby eliminate line defects. The widths are 10 μm, 8 μm, 8 μm, respectively. on the other hand, the pixel electrodes individually formed in units of pixels and the longitudinally extending portions of the signal lead electrodes of the common electrode are slightly narrowed in width so that they measure 5 μm and 6 μm, respectively. Although such a decrease in width of these electrodes can lead to an increase in the risk of an open-circuit disconnection due to mixture of foreign particles or contaminants, the risk in this case is limited merely to partial defects at one pixel, and will hardly result in occurrence of line defects. The signal electrode 3 and common electrode 1 have been provided at an interval of 2 μm with a dielectric film 25 residing between them. The number of pixels was set at 640×3×480 as a result of employment of 640×3 (R, G, B) signal lead electrodes and 480 lead electrodes as a whole.

Figures 7A, 7C:
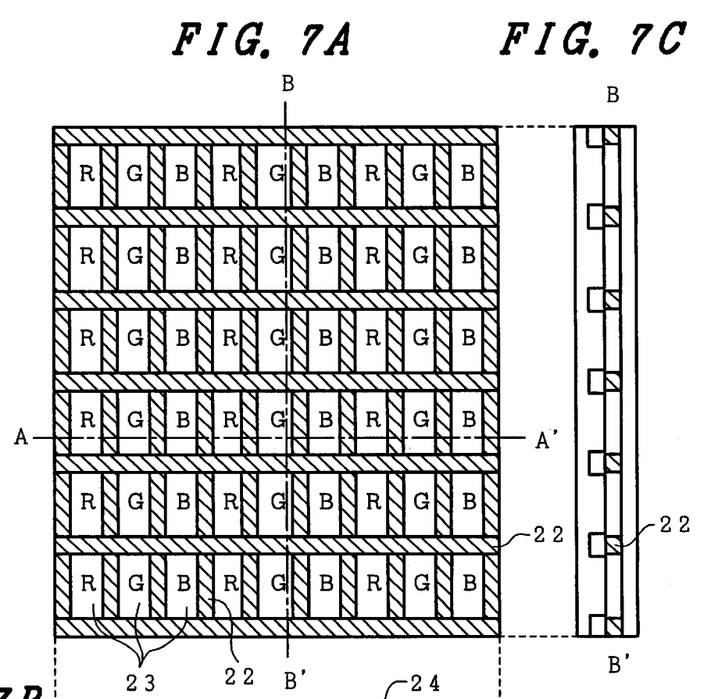
FIGS. 7A–7C are diagrams for explanation of the structure of a color filter substrate with a black matrix (BM) associated therewith.
Figure 7B:
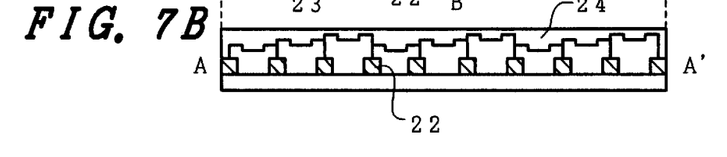

FIGS. 7A–7C are diagrams for explanation of the structure of a color filter substrate with a black matrix (BM) associated therewith, wherein FIG. 7A is a plan view as seen from a direction at right angles to the substrate surface, FIG. 7B is a sectional view of the structure in FIG. 7A as taken along line A–A', and FIG. 7C is a sectional view of the structure of FIG. 7A taken along line B–B'.

As for the black matrix 22, a certain material was used which contains a mixture of carbon and organic pigment. The layout of the black matrix 22 with respect to the electrode substrate is shown by broken lines in FIG. 6A.

After formation of the black matrix 22, respective R, G and B pigments are scattered or dispersed into a photosensitive resin to form respective color filters 23 through coating and patterning exposure plus development process steps. And, an epoxy-based high polymer thin film was deposited and coated on these color filters 23 as an overcoat film 24.

In the illustrative embodiment, polyimide was employed as the orientation film; and, in order to permit orientation of the liquid crystal molecules on the surface thereof, the light irradiation apparatus which has been explained with reference to FIGS. 1 to 5 was used to irradiate polarized light ultraviolet rays thereon. The light source used was a KrF excimer laser having a wavelength of 248 nm.

The irradiation energy at this time was such that 76 shots of rays were emitted at 5 mJ/cm². The substrate was scanned at a constant speed while the substrate feeding speed was so set as to ensure that the irradiation plane or surface was uniformly irradiated with polarized ultraviolet rays at 75 shots. The polarized light separator plate disposed at said Brewster angle was comprised of a quartz plate with multiple films laminated thereon, the plate having long sides of 25 cm and short sides of 3 cm, with the long sides being disposed in parallel with the substrate.

Figure 8:
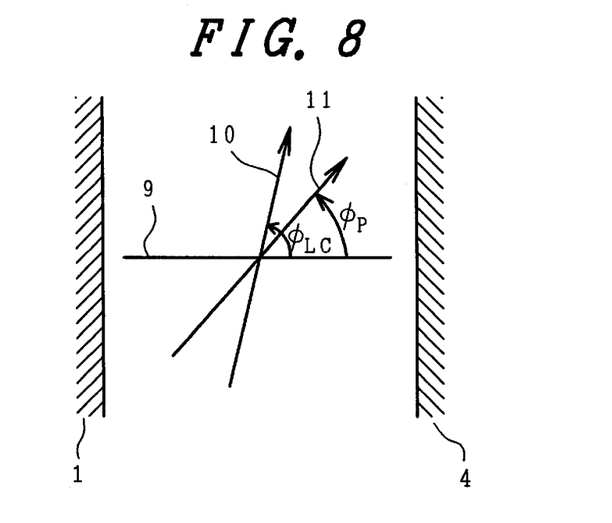
FIG. 8 is a diagram for explanation of the definitions of the orientation direction of an orientation film along with the optical transmission direction of a polarizing plate as disposed on an outer surface of the substrate.

FIG. 8 is a diagram used to explain a definition of the orientation direction of the orientation film and of the permeation axis direction of a polarizing plate to be disposed on the outer surface of the substrate, wherein numeral 9 designates an electric field direction, 10 denotes an orientation control direction of the orientation film, and 11 indicates the polarizing plate's permeation axis direction.

In this embodiment, liquid crystal molecules behave to exhibit orientation in a direction perpendicular to the polarized light. To ensure that the orientation easy axes of those liquid crystal molecules residing at or near the interface between the upper and lower orientation films lie substantially parallel to each other, the angle defined relative to an electric field application direction was set at 75 degrees.

More specifically, as shown in the drawing, the liquid crystals molecule orientation easy axes on the interface between the upper and lower orientation films lie almost parallel to each other while at the same time an angle relative to the direction of an electric field being applied thereto was set at 75 degrees ($\phi_{LC1}=\phi_{LC2}=75°$).

Nematic liquid crystal composition was sealed between both substrates, which is positive and measures 7.3 in dielectric constant anisotropy $\Delta\epsilon$. and is 0.074 (wavelength of 589 nm at 20° C.) in refractive index anisotropy $\Delta n$, thereby providing a liquid crystal layer.

The distance—namely cell gap "d"—between the two substrates (TFT substrate and color filter substrate) is defined by dispersing spherical polymer beads between the substrates so that 4.0 μm is set in the liquid crystal sealed state. Hence, $\Delta n \cdot d$ is 0.296 μm.

The liquid crystal panel is sandwiched between two polarizing plates (for example, a product IIG1220DUII commercially available from Nitto Denko company in Japan) in a way such that one polarizer plate was designed to have its polarized light permeation axis set at $\phi_{p1}=75°$, while the other was set at right angles thereto, i.e. $\phi_{p2}=-15°$. In this embodiment the normally-close characteristic was employed wherein the dark state is established upon application of a low voltage ($V_{OFF}$) whereas the bright state is set up at a high voltage ($V_{ON}$).

Figure 9:
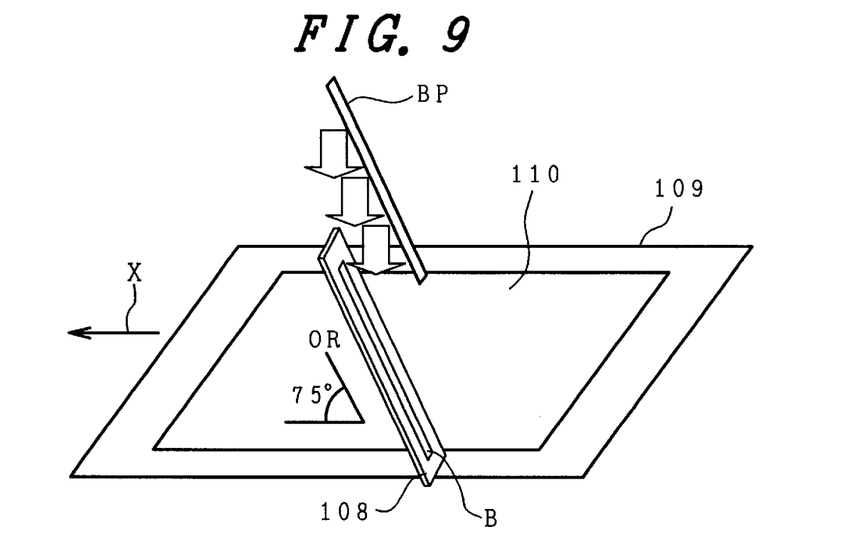
FIG. 9 is a diagram for explanation of a relation of the substrate and polarized light separator plate as well as a polarized light beam upon irradiation of polarized ultraviolet rays onto polyimide films which have been formed on the TFT substrate and color filter substrate, respectively.

FIG. 9 is a diagram used to explain a relation among the substrate and the polarized light separator plate as well as the polarized beam when irradiating polarized ultraviolet rays onto polyimide films which have been formed on the TFT substrate and the color filter substrate, respectively.

In the drawing, "BP" designates a beam pattern, 108 indicates a polarized light separator plate, "OR" denotes an orientation direction of the liquid crystal molecules, "B" indicates irradiation P-wave polarized light, "X", indicates a moving direction of the substrate, 109 represents a scanning means (X-Y stage), and 110 shows a substrate with an orientation film formed thereon.

As shown in the drawing, the polarized light separator plate 108 is disposed at an angle of 75 degrees relative to the moving direction (scanning direction) of the substrate 110, while the length along its long-side direction was set at 25 cm, which may cover the width of substrate 110. With such a layout, single scanning was sufficient to enable completion of the intended irradiation of light.

The active-matrix type liquid crystal panel in accordance with the embodiment I obtained in this way was capable of exhibiting wide view-field angles to the extent that any inversion of the visual gradation hardly takes place, while simultaneously maintaining its contrast at 10 or higher at the major up-and-down/right-and-left view field angles of 80 degrees or wider, which in turn makes it possible to achieve excellent image display ability with enhanced display uniformity.

EMBODIMENT 2

The second embodiment of this invention is the same as the first embodiment except for certain points to be explained below.

More specifically, in this embodiment, polyimide having a stilbene structure was employed as the orientation film, while liquid crystal orientation controllability was added by irradiating Polarized light ultraviolet rays onto the surface thereof.

An extra-high pressure mercury arc lamp (wavelength of 365 nm) was used as the light source, whose irradiation energy was 5 mJ/cm², and the substrate was driven to move or travel at a feed speed of 0.2 cm/s for uniform irradiation of the irradiation plane (orientation film).

The active-matrix type liquid crystal panel of this embodiment thus obtained exhibited wide view-field angles to the extent that no inversion of the visual gradation occurred while maintaining its contrast at 10 or higher at the up-and-down/right-and-left view field angles of 80 degrees or greater, which in turn enabled attainment of image display ability with excellent display uniformity.

EMBODIMENT 3

The third embodiment of the invention is the same as the first embodiment, except for the following points.

Namely, in this embodiment, polyimide was employed as the orientation film of the substrate in a way such that an irradiation apparatus which is the same as that stated above was used to irradiate polarized light on the surface thereof. For the light source used therein, a KrF excimer laser (wavelength of 248 nm) was used to exhibit 25-shot emission with the irradiation energy set at 5 mJ/cm$^2$. The substrate was so designed as to offer the ability to scan at a constant speed, while the substrate feeding speed was set so as to enable the irradiation surface to be uniformly illuminated with polarized UV at 25 shots.

Additionally, the X-Y stage for moving the substrate may comprise a heater device to thereby effectuate irradiation of polarized light while heating the substrate up to 80° C. In such case, the time taken for polarized light irradiation was half of that required when no heating was employed.

Also, the active-matrix type liquid crystal panel thus obtained was able to exhibit wide view-field angles to the extent that no inversion of the visual gradation took place, while at the same time maintaining its contrast at 10 or more at major up-and-down/right-and-left view field angles of 80 degrees or wider, which in turn enabled attainment of image display ability with extremely less color shift.

A further detailed explanation will next be given of a liquid crystal-display device of the lateral electric field type to which the present invention is applied.

Figure 10:
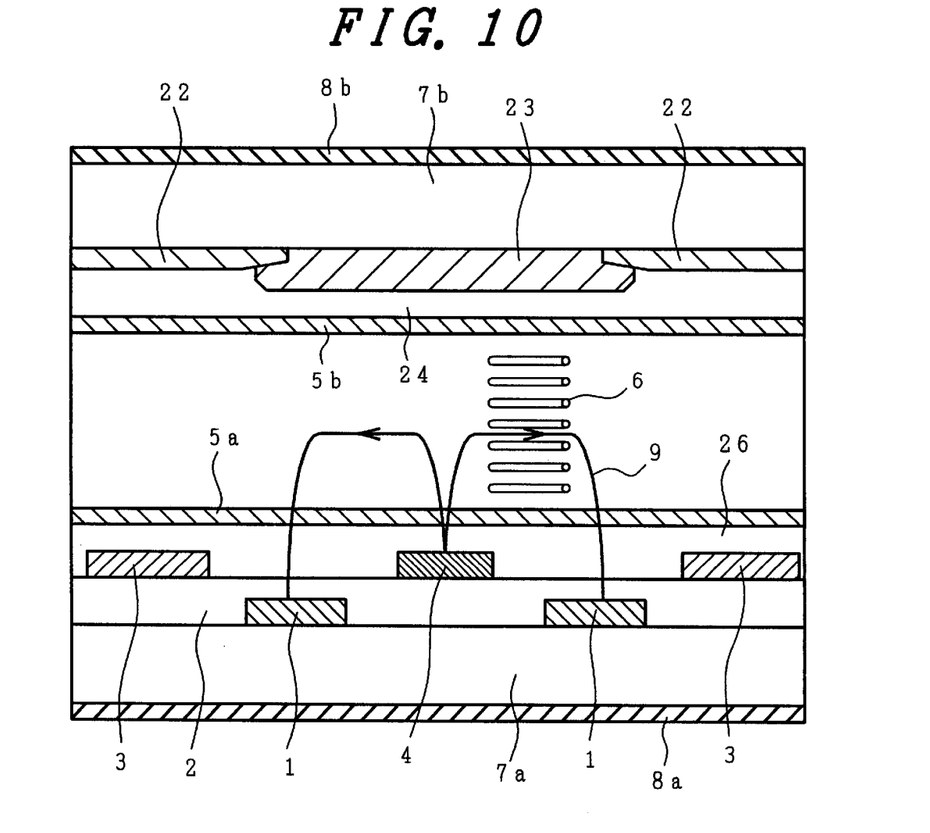
FIG. 10 is a cross-sectional diagram of one pixel of a liquid crystal display device of the type which employs lateral electric field switching.

FIG. 10 is a sectional diagram showing one pixel of the lateral electric-field type liquid crystal display device, wherein the numeral 1 designates a common electrode; 2 denotes a gate insulation film; 3 denotes an image signal electrode; 4 denotes a pixel electrode; 5a denotes a lower orientation film; 5b denotes an upper orientation film; 6 indicates, liquid crystal molecules; 7a denotes a lower substrate; 7b denotes an upper substrate; 8a indicates a lower polarizing plate; 8b denotes an upper polarizer plate; 9 denotes electric field; 22 indicates a black matrix; 23 indicates color filters; 24 denotes an overcoat film; and 26 denotes an dielectric film (PSV).

In the drawing, the lower substrate 7a is arranged such that a thin-film transistor 14 (see FIG. 1) is formed on a silicon nitride film (SiN) 2 along with the image signal electrode (pixel electrode) 3, which is an electrode for use in driving the liquid crystal and the common electrode 1, wherein the dielectric film 26 is formed so as to overlie these electrodes. And, the color filters 23 partitioned by the black matrix 22 are formed on the upper substrate 7b, wherein a liquid crystal layer consisting essentially of the liquid crystal molecules 6 is sandwiched between the lower orientation film 5a and the upper orientation film 5b, which are formed on the opposite surfaces of both substrates 7a and 7b. Note that the lower polarizing plate 8a and the upper polarizing plate 8b are laminated, respectively, on the outer surfaces of the lower substrate 7a and upper substrate 7b. Also, note that indium tin oxide (ITO) is used for the image signal electrode and common electrode 1 in direct contact with the orientation films and liquid crystal layer, for taking into account the possibility of metal corrosion.

The liquid crystal orientation controllability of these orientation films 5a and 5b is achieved by use of the methods and apparatus as explained in the foregoing embodiments.

Figure 11:
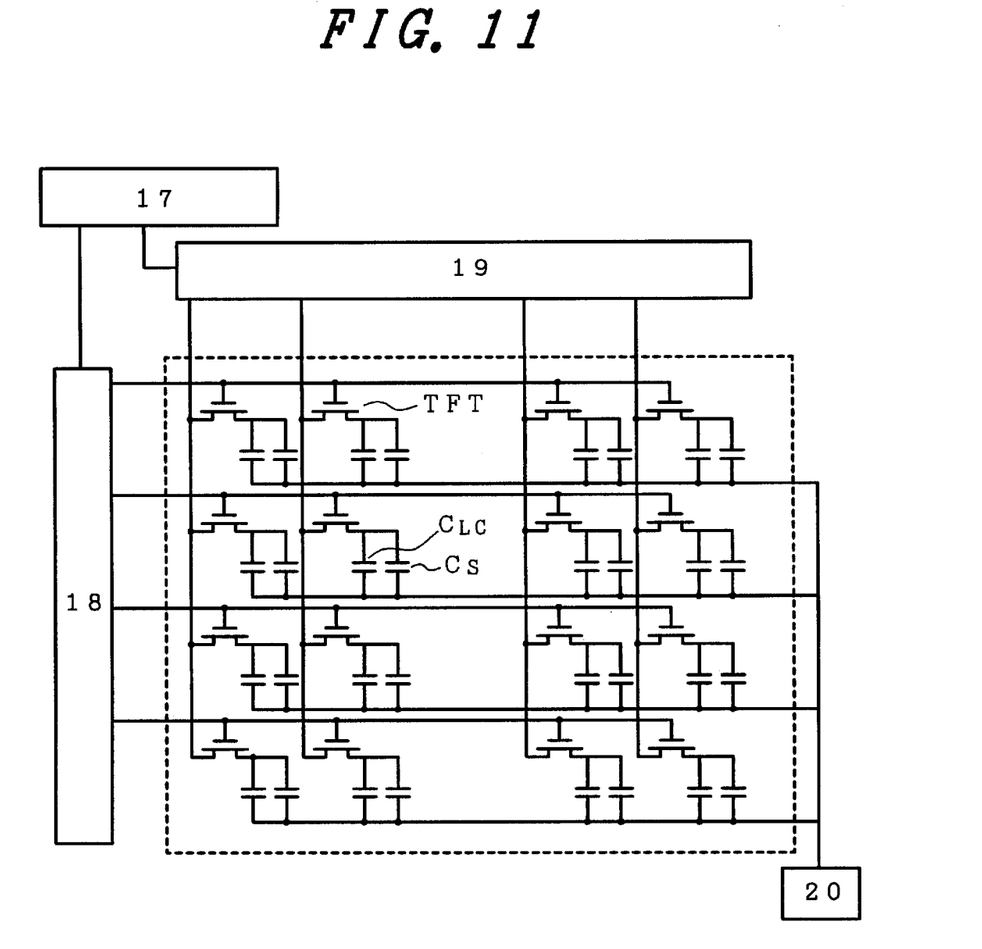
FIG. 11 is a schematic diagram of a drive circuit used in a liquid crystal display device of the active matrix type.

FIG. 11 is a conceptual diagram of a drive circuit adapted to be used in an active-matrix type liquid crystal display device, wherein numeral 17 designates a control circuit, 18 represents a scan electrode driving circuit, 19 denotes a signal electrode drive circuit, 20 indicates a common electrode drive circuit, and 21 denotes the active-matrix type liquid crystal display device. Note that $C_{LC}$ indicates the capacitance component of the liquid crystal, whereas $C_S$ represents the storage capacitance.

A TFT for switching each pixel of the active-matrix liquid crystal display device 21 is selectively turned on and off by the scan electrode drive circuit 18 and the signal electrode drive circuit 19, as well as the common electrode drive circuits 20. This turn-on/off operation is under overall control of the control circuit 17.

The liquid crystal layer whose molecule orientation direction changes due to the above-mentioned turn-on/off operation of the TFTs is such that the initial orientation direction is established depending upon the orientation state (orientation controllability) of the lower and upper orientation films 5a, 5b as formed on both substrates 7a, 7b.

Additionally, although in the above explanation both of the orientation films 5a and 5b have been described as having liquid crystal orientation controllability added thereto by using a polarized light irradiation method and apparatus, optionally one of the orientation films may be processed by a conventional rubbing method.

Figure 12:
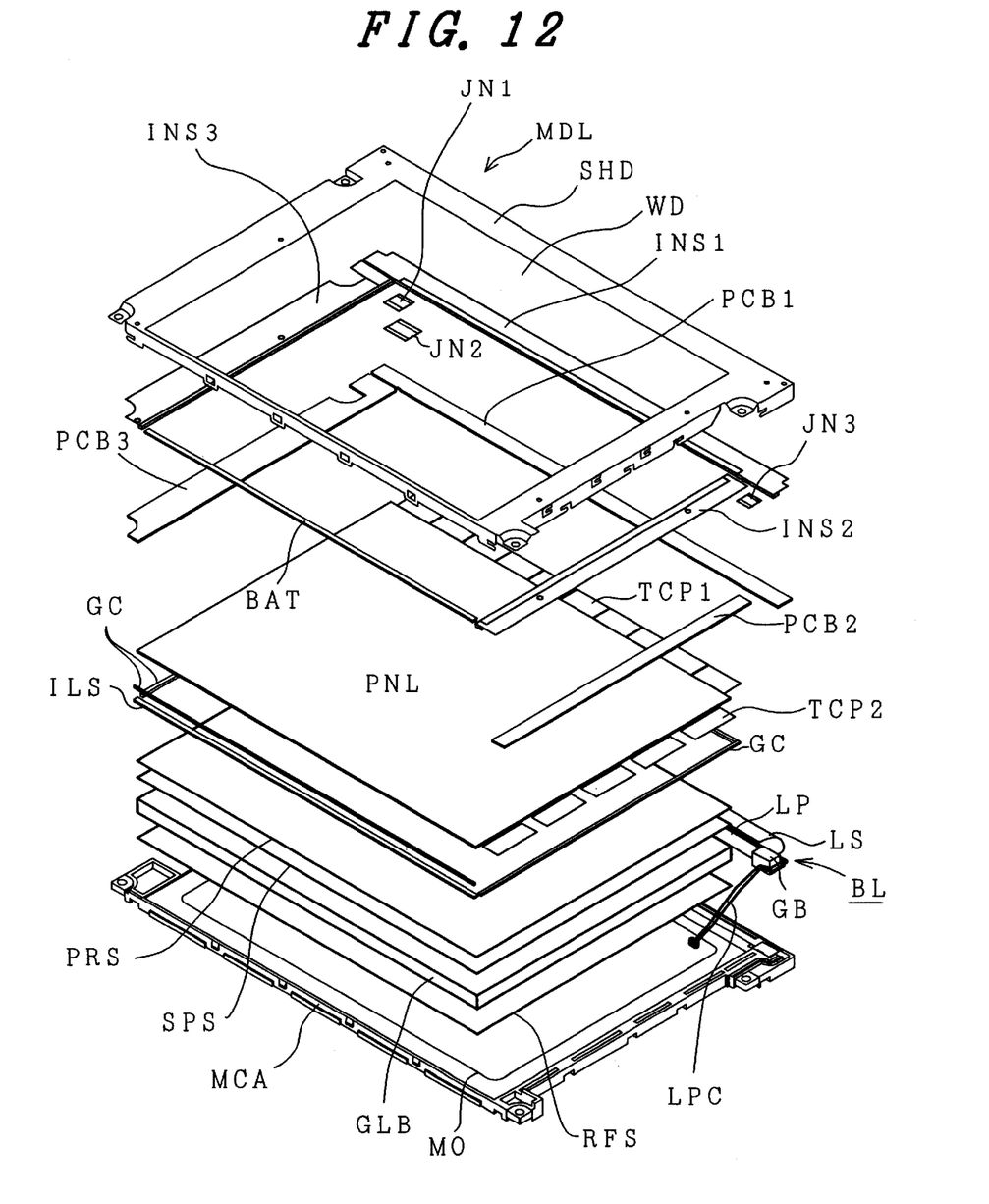
FIG. 12 is an exploded perspective diagram of an active-matrix type liquid crystal display device employing an orientation film with the liquid crystal orientation controllability added thereto in accordance with the present invention.

FIG. 12 is an exploded perspective view for use in explaining the overall configuration of an active-matrix type liquid crystal display device which makes use of more than one orientation film to which liquid crystal orientation controllability has been added in accordance with the present invention.

The drawing shows one example of a practical structure of the liquid crystal display device (referred to hereinafter as a module, MDL in which the liquid crystal display panel and circuit board plus back-light are integrated together with any other constituent parts or components associated therewith).

SHD is a shield case made of a metal plate (also referred to as a "metal frame"), WD is a display window, INS1-3 are dielectric sheets, PCB1-3 are printed circuit boards (PCB1 is a drain-side circuit board: an image signal line driving circuit board, PCB2 is a gate-side circuit board, PCB3 is an interface circuit board), JN1-3 are joiners for electrically connecting the circuit boards PCB1-3 together, TCP1, TCP2 are tape carrier packages, PNL is a liquid crystal display panel, GC is a rubber cushion, ILS is a light shield spacer, PRS is a prism sheet, SPS is a light diffuser sheet, GLB is a light guide plate, RFS is a reflector sheet, MCA is a lower side case (mold frame) formed by integration machining techniques, MO is an opening in the case MCA, LP is a fluorescent lamp, LPC is a lamp cable, GB is a rubber bush that supports the fluorescent lamp LP, BAT is a double-side or both-surface adhesive tape, and BL is a back-light which comprises a fluorescent tube or light-guide plate or the like, wherein the optical diffusion plate members are stacked or laminated in the layout relationship depicted in the drawing to thereby permit assembly of the liquid crystal display module MDL.

The liquid crystal display module MDL has two kinds of housing/holding members, including the lower case MCA and the shield case SHD, and is structured from an integral assembly of the metallic shield case SHD, which houses and stably holds therein the dielectric sheets INS1-3 and circuit boards PCB1-3 along with liquid crystal display panel PNL, and the lower case MCA, which houses therein the backlight BL, that in turn consists essentially of the fluorescent tube LP, light guide plate GLB, prism sheet PRS, and the like.

An integrated circuit chip is mounted on the image signal line drive circuit board PCB1 for driving a respective one of the pixels of the liquid crystal display panel PNL, while there are built on the interface circuit board PCB3 an integrated circuit chip for receiving image signals from an external host and also for receiving control signals, such as timing signals and the like, along with a timing converter CON for generating a clock signal by processing the timing, and the like.

The clock signal generated by the timing converter is supplied to the integrated circuit chip mounted on the image signal line drive circuit board PCB1 via one or several clock signal lines CLL extending on the interface circuit board PCB3 and the image signal line drive circuit board PCB1.

The interface circuit board PCB3 and the image signal line drive circuit board PCB1 are multi-layered printed circuit boards, wherein the aforementioned clock signal lines CLL are formed as inner-layer leads of the interface circuit board PCB3 and image signal line drive circuit board PCB1.

Additionally, the drain-side circuit board PCB1 for use in driving TFTs and the gate-side circuit board PCB2 as well as the interface circuit board PCB3 are connected to the liquid crystal display panel PNL via the tape carrier packages TCP1, TCP2 while the joiners JN1, 2, 3 are used to connect between respective substrates.

The liquid crystal display panel PNL is an active-matrix type liquid crystal display device of the lateral electric field type in accordance with the present invention, wherein liquid crystal orientation controllability has been added to the orientation film(s) thereof by optical orientation, as has been explained with reference to the foregoing embodiments.

Figure 13:
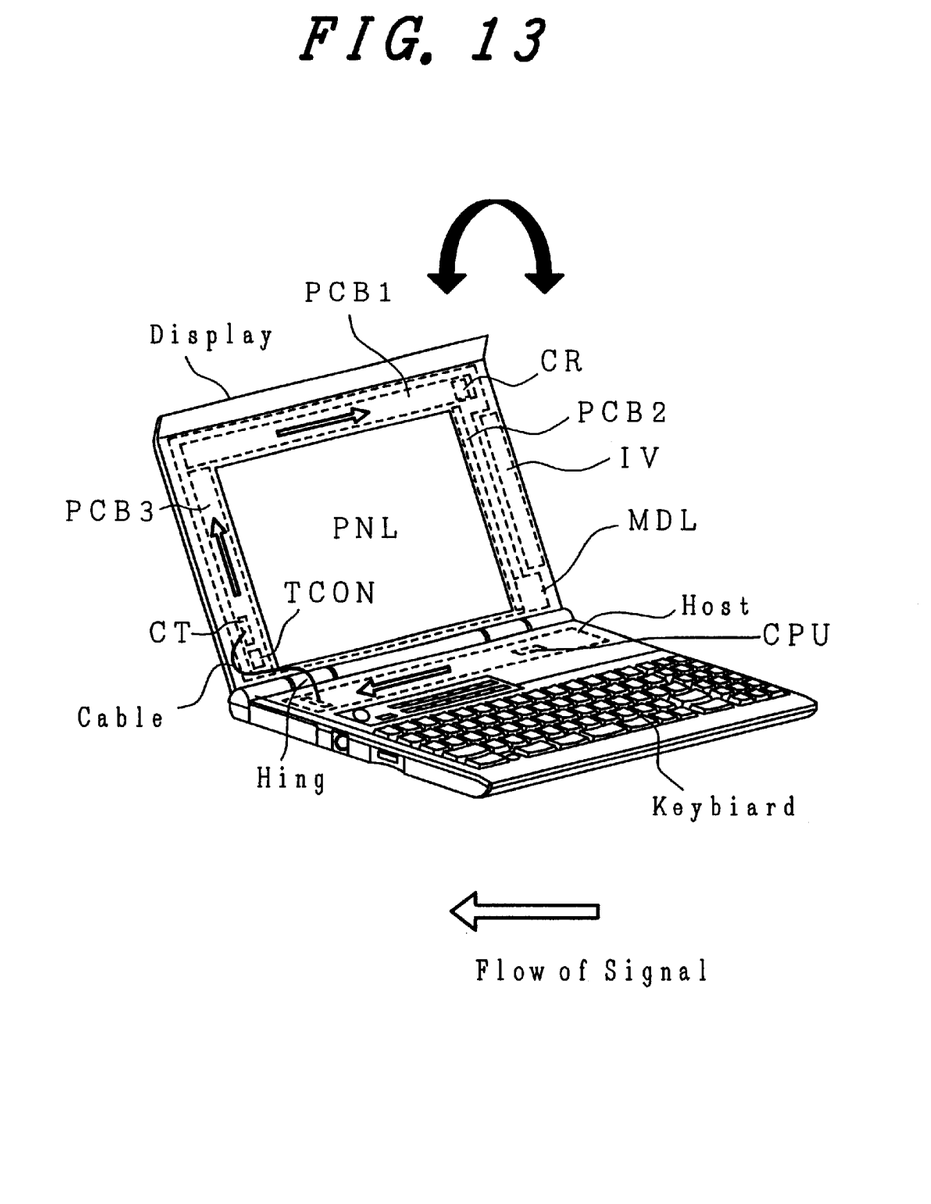
FIG. 13 is a perspective view depicting an overview of a personal computer for explanation of one example of information processing equipment using the liquid crystal display device shown in FIG. 12.

FIG. 13 is a diagram showing an overview of a personal computer representing one example of information processing equipment using the liquid crystal display device shown in FIG. 12, wherein the same reference characters as those in each drawing correspond to the same portions, and wherein IV designates an inverter power supply for use in driving the fluorescent tube, whereas CPU denotes a host-side central processor device.

In the personal computer shown in the same drawing, the view field angle is wider, while simultaneously enabling achievement of a uniform-contrast image display.

It should be noted that the present invention should not be limited to only active-matrix type liquid crystal display devices of the lateral electric-field type, and may likewise be applied as a method and apparatus for adding liquid crystal orientation controllability to the orientation films in liquid crystal display devices of longitudinal electric field type or simple-matrix devices.

As has been described above, according to the present invention, it is possible to provide a polarized light irradiation method and apparatus which is capable of uniformly adding liquid crystal orientation controllability with enhanced efficiency and increased accuracy to more then one orientation film for use with extra-large screen liquid crystal display devices, and which may be significantly advantageous in obtaining a liquid crystal display device which is capable of displaying high-quality images with increased reliability.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display device comprising:
a pair of substrates;
a liquid crystal layer interposed between said pair of substrates and having a changeable molecular orientation state for changing optical characteristics thereof;
an orientation film disposed between one of said pair of substrates and said liquid crystal layer, said orientation film having liquid crystal orientation controllability;
wherein said orientation film is UV (ultraviolet) light responsive orientation film having one orientation direction without occurrence of on-the-screen seam lines by irradiation with the UV light having a rectangular shaped radiating area with a length of a long side being larger than a width of said orientation film while moving said orientation film, said one orientation direction being obtained by the UV light irradiation of said orientation film from a light source.

2. A liquid crystal display device according to claim 1, wherein said orientation film is an organic high-molecular film including a stilbene structure.

3. A liquid crystal display device according to claim 1, further comprising a polarizer plate provided on at least one of said pair of substrates.

4. A liquid crystal display device according to claim 1, wherein one of said pair of substrates is provided with an electrode structure for generating an electric field to said liquid crystal layer having a component parallel to the substrate.

5. A liquid crystal display device according to claim 1, wherein said one orientation direction is substantially parallel at both of said pair of substrates.

6. A liquid crystal display device according to claim 5, wherein the liquid crystal display device has a normally-closed characteristic.

7. A liquid crystal display device according to claim 4, wherein said electrode structure includes a common electrode and a pixel.

8. A liquid crystal display device according to claim 1, wherein the liquid crystal display has a size of at least 10 inches.

9. A liquid crystal display device according to claim 1, wherein said orientation film is formed on said one of said pair of substrates, said one of said pair of substrates being moved while said orientation film is irradiated with the UV light.

10. A method for manufacturing a liquid crystal display device including a step of radiating UV (ultraviolet) light to an orientation film formed on a substrate while moving the substrate, the UV light having a rectangular shaped radiating area with a length of a long side being larger than a width of the orientation film.

11. A method for manufacturing a liquid crystal display device according to claim 10, wherein the substrate moves in one direction during the UV light radiation.

12. A method for manufacturing a liquid crystal display device according to claim 10, further including step of radiating the UV light to the orientation film while heating the substrate on which the orientation film is formed.

13. A method for manufacturing a liquid crystal display device according to claim 12, wherein the substrate moves in one direction during the UV light radiation.

14. A method for manufacturing a liquid crystal display device according to claim 10, wherein the UV light uses as a light source at least one of an excimer laser, argon laser, gas laser, solid-state laser, semiconductor laser and pigment laser.

15. A method for manufacturing a liquid crystal display device according to claim 10, wherein the UV light has harmonic components combined with non-linear optical materials and at least one of an excimer laser, argon laser, gas laser, solid-state laser, semiconductor laser and pigment laser as a light source.

16. A method for manufacturing a liquid crystal display device according to claim 10, wherein the UV light uses as a light source at least one of a high-pressure, middle-pressure and low-pressure mercury arc lamp and a xenon lamp.

17. A method for manufacturing a liquid crystal display device according to claim 12, wherein the UV light uses a light source at least one of an excimer laser, argon laser, gas laser, solid-state laser, semiconductor laser and pigment laser.

18. A method for manufacturing a liquid crystal display device according to claim 12, wherein the UV light has harmonic components combined with non-linear optical materials and at least one of an excimer laser, argon laser, gas laser, solid-state laser, semiconductor laser and pigment laser as a light source.

19. A method for manufacturing a liquid crystal display device according to claim 12, wherein the UV light uses as a light source at least one of a high-pressure, middle-pressure and low-pressure mercury arc lamp and a xenon lamp.

* * * * *